(12) United States Patent
Aase et al.

(10) Patent No.: US 7,374,231 B2
(45) Date of Patent: May 20, 2008

(54) FORCE AND DECELERATION DELIMITING DEVICES AND METHODS FOR OPERATING THE SAME

(75) Inventors: Jan H. Aase, Oakland Township, MI (US); Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 233 days.

(21) Appl. No.: 11/093,272

(22) Filed: Mar. 29, 2005

(65) Prior Publication Data
US 2005/0234140 A1   Oct. 20, 2005

Related U.S. Application Data

(60) Provisional application No. 60/559,115, filed on Apr. 2, 2004.

(51) Int. Cl.
*B60R 19/42* (2006.01)
(52) U.S. Cl. .......................... 296/187.02; 296/187.03; 296/187.06; 293/118
(58) Field of Classification Search .......... 296/187.02, 296/187.09, 187.11, 187.12, 193.05, 193.06, 296/204, 203.01, 205, 203.02, 209, 203.03, 296/187.03, 187.06; 293/116, 118; 188/377
See application file for complete search history.

(56) References Cited

U.S. PATENT DOCUMENTS

| | | | |
|---|---|---|---|
| 3,339,673 A * | 9/1967 | Schafer ...................... 188/377 |
| 3,888,502 A * | 6/1975 | Felzer et al. ................ 280/784 |
| 4,170,380 A * | 10/1979 | Raitport ..................... 296/68.1 |
| 5,454,589 A | 10/1995 | Bosio et al. |
| 5,700,034 A | 12/1997 | Lane, Jr. |
| 5,715,757 A * | 2/1998 | Dannawi et al. .......... 105/392.5 |
| 6,158,771 A * | 12/2000 | Nusser et al. ............... 280/752 |
| 6,302,439 B1 | 10/2001 | McCurdy |
| 6,327,813 B1 * | 12/2001 | Ishiwatari ..................... 43/125 |
| 6,378,933 B1 * | 4/2002 | Schoen et al. ......... 296/187.02 |
| 6,383,610 B1 * | 5/2002 | Barz et al. .................. 428/192 |
| 6,471,285 B1 * | 10/2002 | Czaplicki et al. ...... 296/187.02 |

(Continued)

FOREIGN PATENT DOCUMENTS

DE      44 25 830        5/1995

(Continued)

*Primary Examiner*—D. Glenn Dayoan
*Assistant Examiner*—Greg Blankenship

(57) ABSTRACT

Force and deceleration delimiting devices and methods for operating the same in a vehicle. The devices generally include an open celled material expandable from a non-expanded state to an expanded state, wherein the open celled material is sandwiched between a first end cap member and a second end cap member; an optional support surface cooperatively positioned with the open celled material to cover a surface of the open celled material in the expanded and the non-expanded states; and an optional shield cooperatively positioned with the open celled material to cover a surface of the open celled material in the expanded and the non-expanded states; and an activation mechanism adapted to regulate selective expansion of the open celled material from the non-expanded state to the expanded state in response to a triggering event, wherein the support surface and/or shield have a compact shape when the open celled material is in the non-expanded state and an expanded state when the open celled material is in the expanded state.

15 Claims, 6 Drawing Sheets

U.S. PATENT DOCUMENTS

| | | | |
|---|---|---|---|
| 6,575,526 B2 * | 6/2003 | Czaplicki et al. | 296/187.02 |
| 6,702,366 B1 | 3/2004 | Browne et al. | |
| 6,755,453 B2 * | 6/2004 | Kellas | 293/128 |
| 6,874,831 B1 * | 4/2005 | Pouget et al. | 293/115 |
| 6,877,795 B2 * | 4/2005 | Browne et al. | 296/187.02 |
| 6,920,693 B2 * | 7/2005 | Hankins et al. | 29/897.2 |
| 6,928,736 B2 * | 8/2005 | Czaplicki et al. | 29/897.2 |
| 6,969,551 B2 * | 11/2005 | Richardson et al. | 428/304.4 |
| 7,040,658 B2 * | 5/2006 | Kellas | 280/751 |
| 7,077,460 B2 * | 7/2006 | Czaplicki et al. | 296/187.02 |
| 7,150,495 B2 * | 12/2006 | Fayt et al. | 296/187.02 |
| 2001/0048215 A1 | 12/2001 | Breed et al. | |
| 2003/0155753 A1 | 8/2003 | Breed | |
| 2004/0041418 A1 | 3/2004 | Kellas | |
| 2005/0218696 A1 | 10/2005 | Aase et al. | |
| 2005/0234139 A1 | 10/2005 | Browne et al. | |
| 2005/0234140 A1 | 10/2005 | Aase et al. | |
| 2006/0186701 A1 | 8/2006 | Browne et al. | |

FOREIGN PATENT DOCUMENTS

| | | |
|---|---|---|
| DE | 100 14 888 | 11/2001 |
| EP | 0 978 442 | 2/2000 |
| WO | WO 03/053749 A2 | 3/2003 |

\* cited by examiner

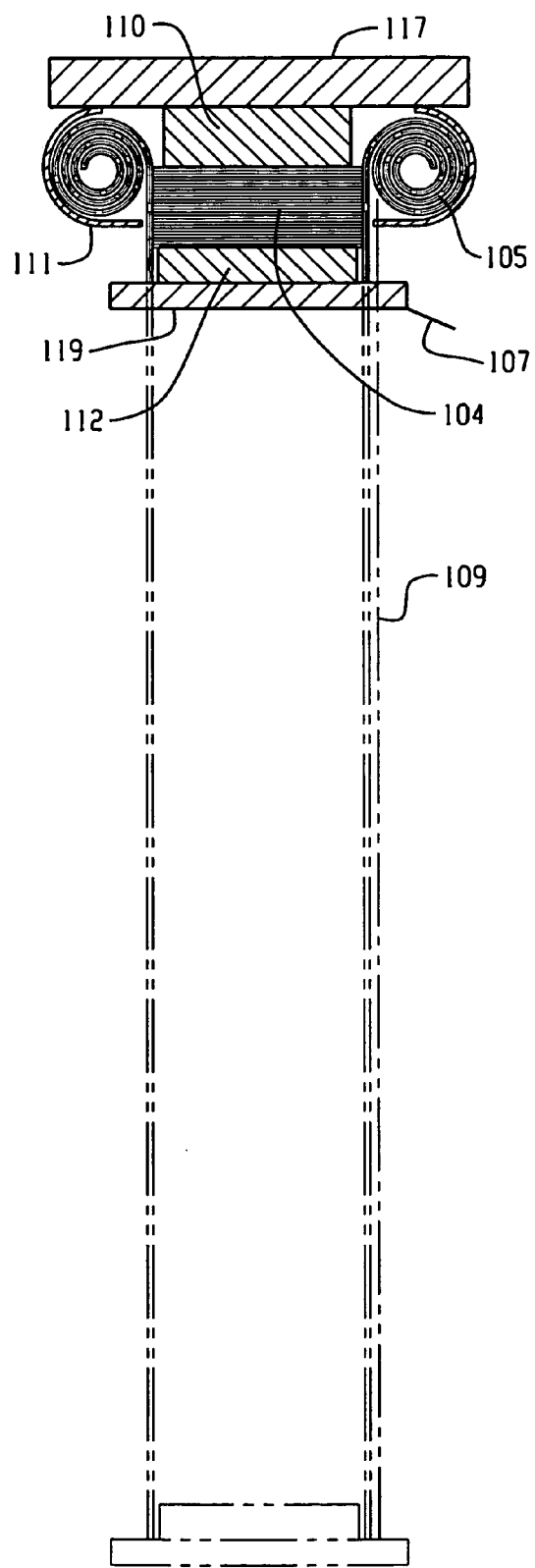
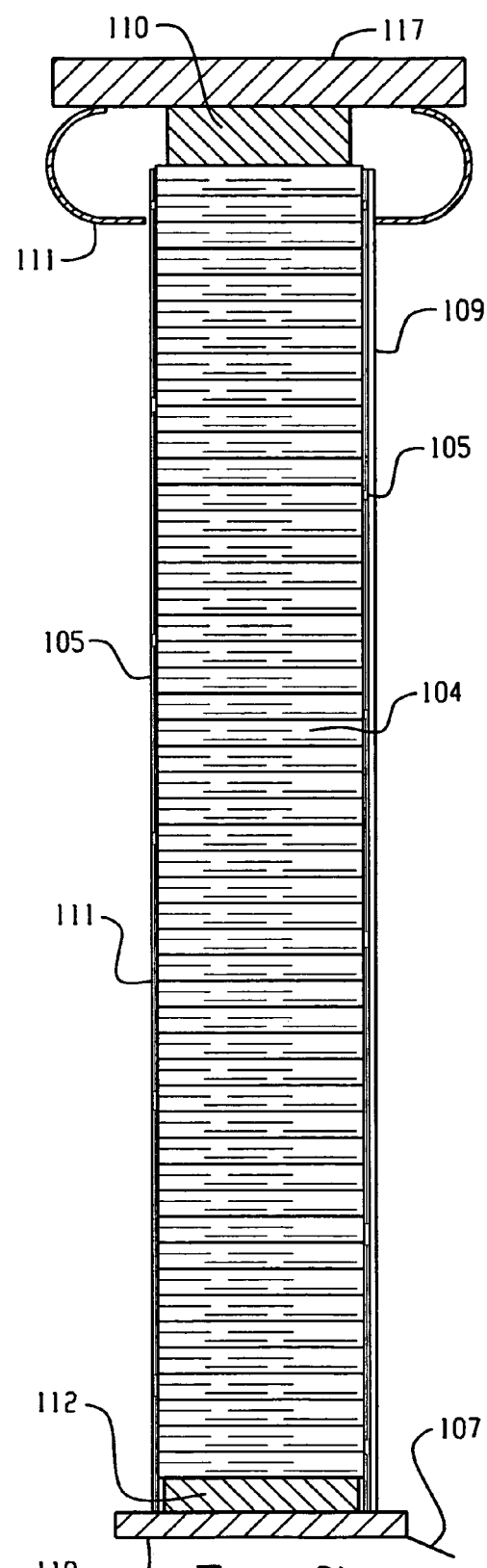

US 7,374,231 B2

FORCE AND DECELERATION DELIMITING DEVICES AND METHODS FOR OPERATING THE SAME

CROSS REFERENCE TO RELATED APPLICATIONS

The present application relates to and claims priority to U.S. Provisional Application No. 60/559,115 entitled "Energy Absorbing Devices, Assemblies, and Methods for Operating the Same" and filed on Apr. 2, 2004, the disclosure of which is incorporated by reference herein in their entirety.

BACKGROUND

The present disclosure generally relates to force and deceleration delimiting devices, and more particularly, to expandable volume filling mechanical structures that generally maintain a compressed volume and rapidly deploy to an expanded volume in response to a triggering event. The expanded volume provides energy absorbing properties to objects impacting the devices.

In the vehicular arts, there are generally two types of dedicated crash energy management structures utilized for minimizing the effect of an impact event: those that are passive, and those that are active. The active used in this context refers to selective expansion or movement of one component relative to another component to minimize the effect of an impact event.

Typically, passive energy absorbing structures have a static configuration in which their volume is fixed. The passive energy absorbing structures can dissipate energy and modify the levels and timing of a force/deceleration pulse by being impacted (e.g., crushing or stroking of a piston in a cylinder) so as to absorb the kinetic energy associated with such an event. Since these passive crash energy management structures occupy a maximum volume in the uncrushed/unstroked initial state, these types of structures inherently occupy significant vehicular space that must be dedicated for crash energy management and/or occupant protection—the contraction space being otherwise unavailable for other use. Expressed another way, passive crash energy management and occupant protection structures use vehicular space equal to their initial volume, which consequently must be dedicated exclusively to impact energy management and/or occupant protection throughout the life of the vehicle. Because of this, some areas of a vehicle interior and/or exterior may be constrained in terms of their design/appearance because of the volume requirements of passive crash energy management and occupant protection devices.

An example of a passive energy absorbing structure that has been used in vehicles is an expanded honeycomb celled material, which is disposed in the expanded form within the vehicle environment. FIG. 1 illustrates a honeycomb celled material and its process flow for fabricating the honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block 16 having a thickness T. The block 16 is then cut into appropriate lengths L to thereby provide so-called bricks 18. The bricks 18 are then expanded by physical separation of the upper and lower faces 20, 22, where adhesive strips serve as nodes to form the honeycomb cells. A fully expanded brick is composed of a honeycomb celled material 24 having clearly apparent hexagonally shaped cells 26. The ratio of the original thickness T to the expanded thickness T' is between about 1 to 20 to about 1 to 60. The honeycomb celled material is then used in fully expanded form within the vehicle environment to provide impact energy management and/or occupant protection (through force and deceleration limiting) substantially parallel to the cellular axis. As noted, because the honeycomb material is used in the fully expanded form, significant vehicular space is used to accommodate the expanded form, which space is permanently occupied by this dedicated energy management/occupant protection structure.

Active energy absorbing/occupant protection structures generally have a predetermined size that expands or moves in response to a triggering event so as to increase their contribution to crash energy management/occupant protection. One type of dedicated active energy absorbing/occupant protection structure is a stroking device, basically in the form of a piston and cylinder arrangement. Stroking devices can be designed, if desired, to have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces in response to a triggering event, e.g., upon the detection of an imminent impact event or an occurring impact event (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio.

Another example of an active energy absorbing/force and/or deceleration limiting structure is an impact protection curtain, e.g., a roll down inflatable shade that may cover a window opening in response to a triggering event. The roll down curtain, while being flexible in bending when out of plane, is quite stiff in-plane. Other devices, such as inflatable curtains, while inflated, act to help cushion the occupant upon impact.

Therefore, missing in the art are expandable energy absorbing/force and/or deceleration limiting devices for impact attenuation.

BRIEF SUMMARY

Disclosed herein are force and deceleration delimiting devices for a vehicle and methods for absorbing and/or attenuating an impact energy of an object in a vehicle environment. As used herein, reference to "energy absorbing" also refers to force and/or deceleration limiting since the devices described herein will function to limit the impact force on or deceleration of an object during an impact event. In one embodiment, a force and deceleration delimiting device for a vehicle comprises an open celled material expandable from a non-expanded state to an expanded state, wherein the open celled material is sandwiched between a first end cap member and a second end cap member; a support surface cooperatively positioned with the open celled material to cover a surface of the open celled material in the expanded and the non-expanded states; and an activation mechanism adapted to regulate selective expansion of the open celled material from the non-expanded state to the expanded state in response to a triggering event.

A method for absorbing an impact energy of an object in a vehicle environment comprises sensing an impact event;

triggering an energy absorbing device, wherein the energy absorbing device comprises an open celled material expandable from a non-expanded state to an expanded state, a support surface cooperatively positioned with the open celled material to cover a surface of the open celled material in the expanded and the non-expanded states; and expanding the open celled material to the expanded state.

In another embodiment, a method for absorbing an impact energy, limiting the impact force on, and/or deceleration of an object in a vehicle environment comprises sensing or pre-sensing an impact event; and expanding an open celled material from a compressed volume to an expanded volume, wherein the expanded volume of the open celled material forms a transverse plane substantially perpendicular to an anticipated crash axis, wherein the anticipated crash axis is substantially parallel to a cellular axis of cells of the open celled material.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

FIG. 6 is a perspective side view of a force and deceleration delimiting device having a support sheet and a protection shield in accordance with the present disclosure, shown prior to expansion (stored state);

FIG. 7 is a perspective side view of the device depicted in FIG. 6 upon deployment in accordance with the present disclosure.

DETAILED DESCRIPTION OF THE PREFERRED EMBODIMENT

The present disclosure is directed to expandable force and deceleration delimiting devices that generally maintain a compressed volume and rapidly deploy to an expanded volume in response to a triggering event. As previously expressed, reference made herein to "energy absorbing" also refers to force and/or deceleration limiting since the devices described herein will function to help to reduce the impact force on and/or decelerate an object during an impact event. The expanded volume advantageously provides energy absorbing properties to objects impacting the devices.

In one embodiment, the force and deceleration delimiting device comprises an expandable open celled material, wherein expansion of the open celled material is in a plane transverse to the cellular axis of the cells defining the cellular structure. For this embodiment as well as the other embodiments disclosed herein, crash crush is intended optimally, but not necessarily, to be parallel to the cellular axis. By way of example, a suitable open celled material has a honeycomb cellular structure. In a stowed or compact configuration, the honeycomb cellular structure can generally be defined as a honeycomb brick. The honeycomb brick has an initial compact volume in the sense that it is substantially compressed perpendicular to the longitudinal axis of its cells and parallel to the direction in which it is to be deployed. For ease of understanding, reference will now be made to honeycomb cellular structures although it should be understood that other open celled materials that can be compressed and expanded in the manner discussed below are equally suitable for the force and deceleration delimiting devices disclosed herein.

The honeycomb brick generally occupies anywhere from about 1/10th to about 1/60th of the volume that it assumes when in it is fully expanded (i.e., the expansion ratio), depending on the original cell dimensions and wall thicknesses, although higher or lower ratios can be employed depending on the particular application. Honeycomb cell geometries with smaller values of the above noted expansion ratio, in general, deliver larger crush forces.

The materials for forming the honeycomb cellular structure are not intended to be limited. The choices for materials are generally dependent upon the desired crush force (stiffness) for a particular application (i.e., softer or harder metals or composites). In one embodiment, the honeycomb cellular structure is formed of a lightweight metallic material, e.g., aluminum. Other suitable materials that are non-metallic include, but are not limited to, polymers such as nylon, cellulose, and other like materials. The material composition and honeycomb geometries will be determined by the desired application.

Figure 1:
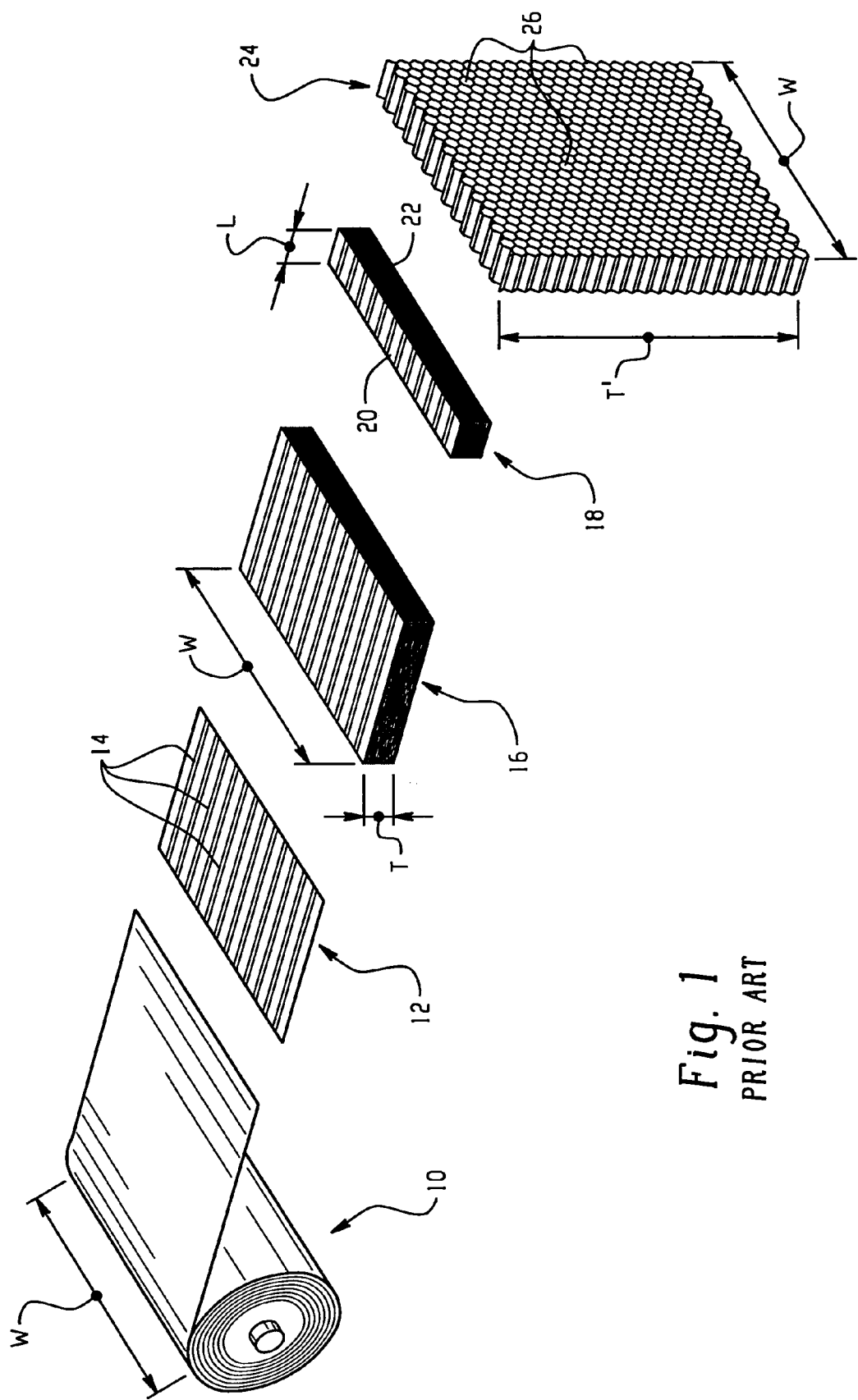
FIG. 1 is a perspective view of a manufacturing process to provide prior art honeycomb celled material.
Figure 2:
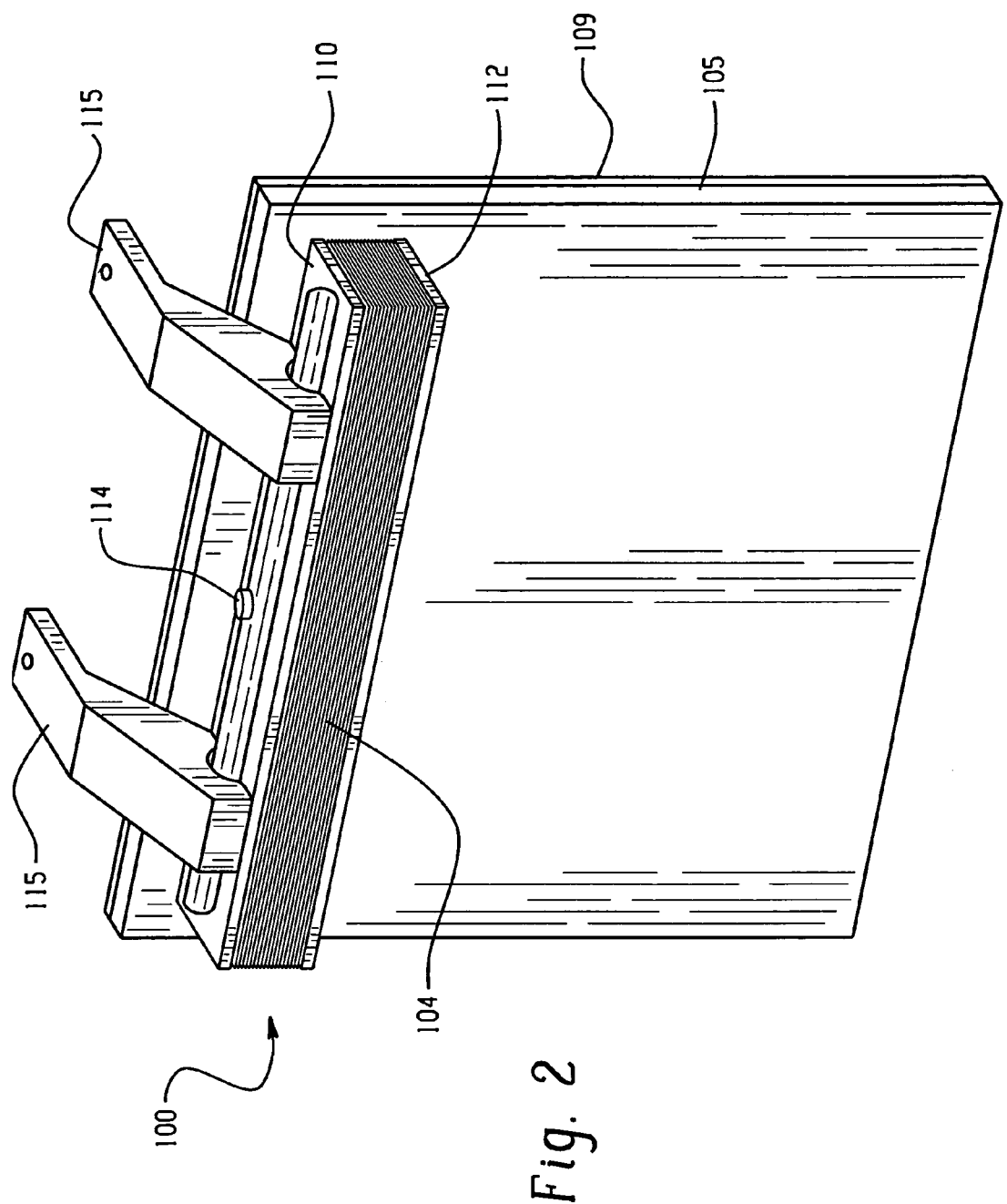
FIG. 2 is a perspective front view of a force and deceleration delimiting device comprising compressed honeycomb cellular material in accordance with the present disclosure, shown prior to expansion (stowed or compacted state)
Figure 3:
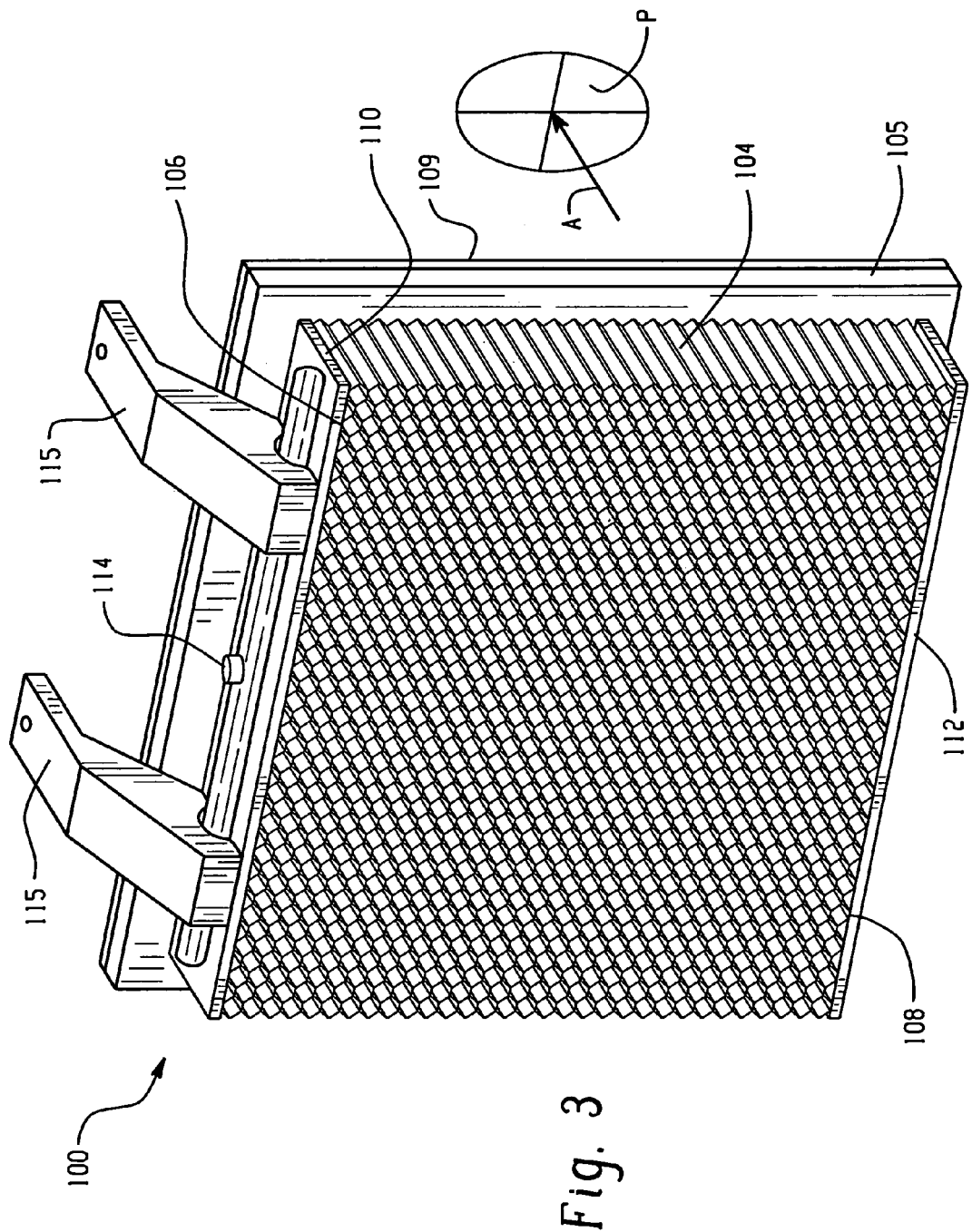
FIG. 3 is a perspective front view of a device comprising expanded honeycomb cellular material in accordance with the present disclosure, shown in an expanded state.

Turning to FIGS. 2 and 3, perspective views of a force and deceleration delimiting device 100 are shown that employ a honeycomb cellular structure 104. In particular, FIG. 2 illustrates the force and deceleration delimiting device in a stowed or compact configuration (i.e., a honeycomb brick configuration) whereas FIG. 3 illustrates the force and deceleration delimiting device upon expansion in response to a triggering event.

As shown more clearly in FIG. 3, the geometry of the cells form the honeycomb cellular structure, although as noted above, other shapes and configurations are possible that would permit compression and expansion in the manner described herein. The honeycomb cellular structure 104 generally terminates at an upper face 106 and a lower face 108. Attached (such as, for example, by an adhesive) to the upper and lower faces 106, 108 are end cap members 110, 112, respectively. The end cap members 110, 112 are substantially rigid and serve as guides for defining the configuration of the honeycombed cellular structure 104 between the stowed or compacted configuration as shown at FIG. 2 and the expanded configuration as shown at FIG. 3. One of the end cap members, e.g., 110, is fixedly attached to the vehicle. As such, upon expansion of the force and deceleration delimiting device 100 in response to a triggering event, end cap member 112 moves relative to end cap member 110. In this manner, upon deployment, the expansion of honeycomb material 104 is in a transverse plane P which is preferably perpendicularly oriented to an anticipated crash axis A without expansion or contraction of the crash axis dimension.

The end cap members 110, 112 need not necessarily be planar as shown. Moreover, the end cap members do not need to have the same shape or size.

For example, the end cap members 110, 112 may comprise a shape that compliments the area within the vehicle where the energy-absorbing device 100 is to be located.

For example, in a wheel well, one or both of the end cap members may be curvilinear in shape as well as sized differently to accommodate the shape of the wheel well. As another example, such as may occur for expansion into a narrowing wedge shaped space, the end cap member (e.g., 112) that moves as the honeycomb cellular structure 104 expands may be shorter than the stationary end cap member (e.g., 110) so that the expanded honeycomb cellular structure 104 has a complimentary wedge shape.

An activation mechanism 114 is operably connected to end cap members 110, 112 to facilitate selective expansion of the force and deceleration delimiting device 100 in response to a triggering event. The activation mechanism 114 controls the volumetric state of the honeycomb-cellular structure 104 such that when activated, expansion from the stowed or compact configuration to the expanded configuration occurs. One or more installation brackets 115 may be connected to one of the end cap members 110, 112 so that the force and deceleration delimiting device 100 is connectable to a selected surface of the motor vehicle.

The force and deceleration delimiting device 100 may further include an optional support surface 105 for controlled directional expansion, which will be described in greater detail below. One support surface 105 or alternatively, two support surfaces can be employed to define a sandwich about the honeycomb cellular structure 104, depending on the application. Optionally, the surfaces 105 can be naturally defined by the vehicle structure in which the energy-absorbing device 100 is disposed. In a preferred embodiment, the support surface 105 is cooperatively disposed with the honeycomb cellular structure 104 opposite to that of an impact, and more preferably, only when a natural vehicle support surface does not exist. Additionally, in applications in which there may be occupant/pedestrian contact directly against the expanded honeycomb cellular structure 104, there may be a deployable front surface shield or screen 109 to smooth out the contact area.

Figure 4:
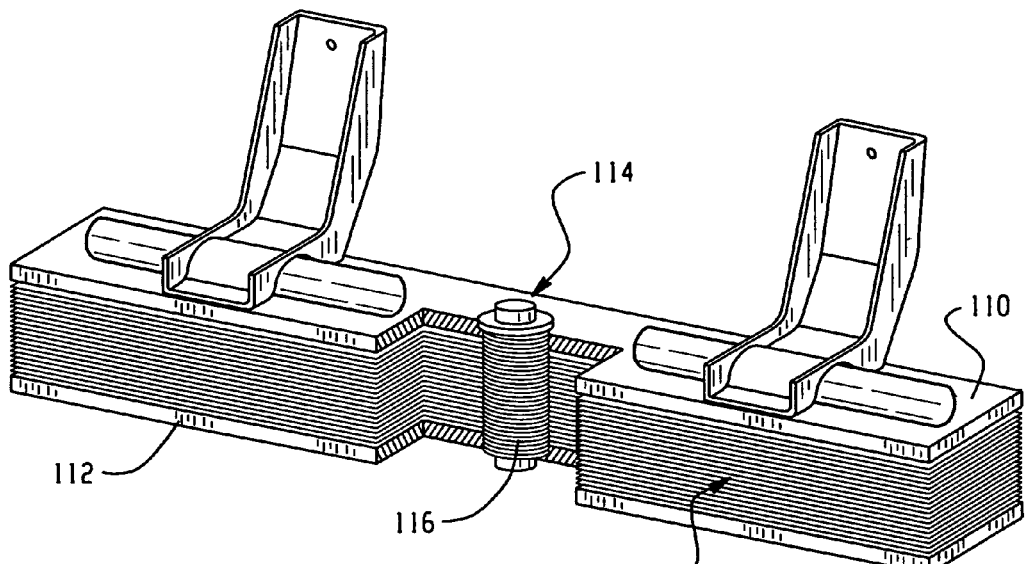
FIG. 4 is a perspective cut-away view of a force and deceleration delimiting device according to the present disclosure, showing an example of an active activation system.
Figure 5:
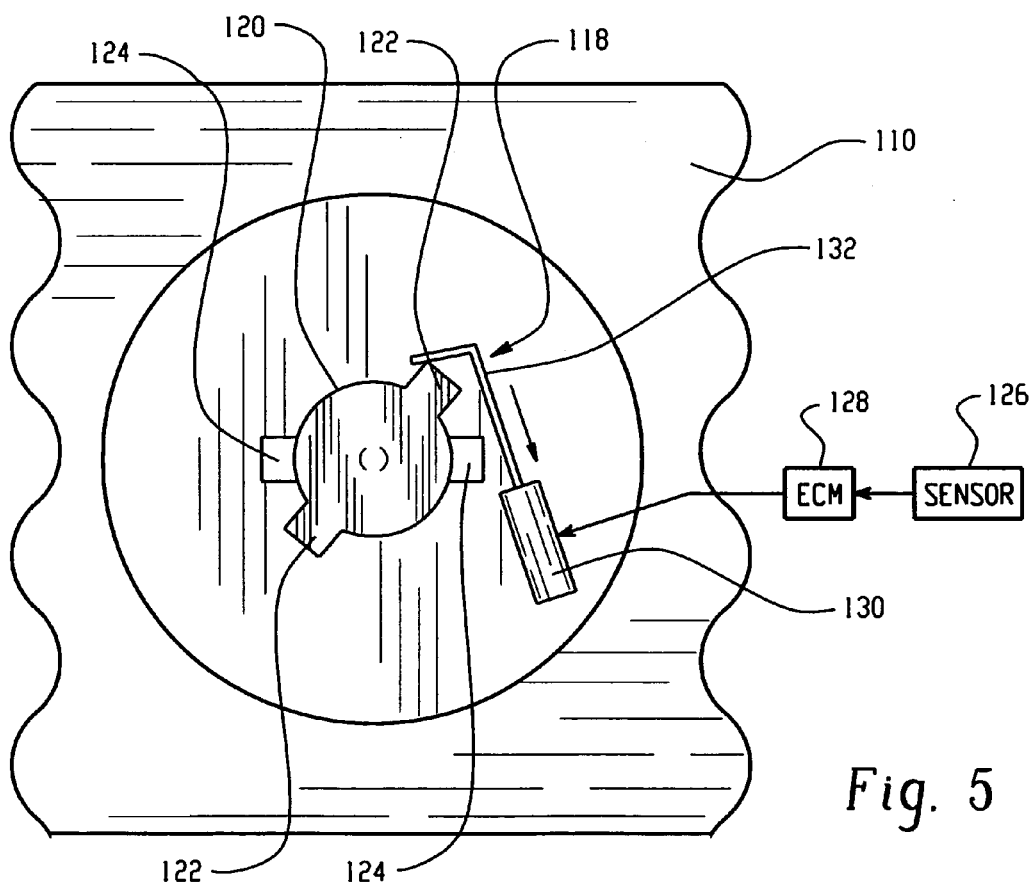
FIG. 5 is a broken-away, top plan view, showing a trigger of an active activation system of FIG. 4.

An example of a suitable activation mechanism 114 is shown in FIGS. 4 and 5. An expansion agent in the form of a compressed spring 116 is abuttingly situated in tension between end cap members 110, 112 when the honeycomb cellular structure 104 is in the compact or stowed configuration. A trigger 118 for selectively releasing energy associated with the compressed spring includes a disk 120 that is rotatably mounted on one of the end cap members, e.g., 110 as shown, wherein the disk has a pair of opposed fingers 122. The shape of the disk 120 is receivable by a similarly shaped opening 124 formed in the end cap member 110. The rotatable disk 120 is further supported by a rigid member (not shown, e.g., a bolt) that is fixedly attached to the opposing end cap member, e.g., 112. Although two opposing fingers are shown, it should be apparent that one or more fingers can be utilized. Moreover, it should be apparent that the shape of the disk 120 or the opening 124 is not intended to be limited and can vary as may be desired provided that locking engagement of the disk 120 against the end cap member 110 occurs in at least one rotational position of the disk and engagement release occurs at a different position.

Activation of the activation mechanism 114 causes the disk 120 to rotate and causes the shape of disk to become aligned with the shape of the opening 124. Upon alignment, the spring 116 is released causing rapid expansion of the honeycomb cellular structure 104. The compressive forces associated with the spring provide the expansion, wherein the magnitude of expansion can generally be increased with greater compressive forces in the spring 116. Other suitable expansion agents may include a pyrotechnic device or a pressurized air cylinder, for example, which is triggered upon rotation of the disk 120 as described or by other triggering means. Other triggering means could be electronically controlled, mechanically controlled, and the like. Alternatively, the activation mechanism 114 may be passive, wherein the impact event itself provides a mechanically trigger.

As previously described, the triggering event activates the activation mechanism 114. As such, the activation mechanism can be in operative communication with a controller for selectively activating the activation mechanism 114. For example, the controller can be an electronic control module 128 that is adapted to receive a signal from a sensor or detector 126, which signal is then interpreted by the electronic control module 128 to activate a solenoid 130. Solenoid 130 includes a linking arm 132 that is shown in operative communication with the disk 120 to effect rotation thereof in response to the activation signal.

As shown more clearly in FIGS. 6 and 7, the energy-absorbing device 100 further includes the optional support layer 105 and optional shield 109. The support surface 105 functions as a support surface and guide for the force and deceleration delimiting device 100 during expansion thereof. In one embodiment, the support surface 105 and/or shield 109 are operably connected to the end cap member 112 as shown. In this manner, upon movement of end cap member 112 relative to end cap member 110 during expansion, the support surface 105 and shield 109 extend along with the honeycomb cellular structure 104. For example, as shown, the support layer 105 and shield 109 can be spooled (or folded or otherwise compacted as may be desired) when the force and deceleration delimiting device is in the stowed or compacted configuration and linearly expand in the direction of force and deceleration delimiting device 100 expansion to provide the support surface/guide and mitigation functions. The support surface 105 preferably comprises a material that is substantially stiff upon extension and resistant to stretching.

Optionally, the force and deceleration delimiting device 100 includes mounting plates 117, 119, fixedly attached to the end cap members 110, 112, respectively, which may further have connected thereto a connecting structure 107. The vehicle connecting structure 107 may include tethers of a fixed length lying in the plane of honeycomb cellular structure 104 routed through openings that define the individual honeycomb cells so that expansion of the energy-absorbing device occurs along a desired direction path. More than one vehicle connecting structure 107 can be used and may be attached at various points of the honeycomb cellular structure 104.

When employed within a passenger compartment of a vehicle, the support surface 105, if one is employed, faces away from the interior of a vehicle, whereas the honeycomb cellular structure 104 faces the interior of the vehicle. If required by the nature of the honeycomb cellular material 104, a shield 109 faces the interior of the vehicle. However, it should be apparent by those in the art that placement and style of the device 100 will be determined by the desired application.

In one embodiment, the support layer 105 and the honeycomb cellular structure 104 may be physically separate with respect to each other upon expansion thereof. In another embodiment, the support layer 105 and the honeycomb cellular structure 104 may be adjacent to each other, each being connected only at selected points, wherein the selected points may constrain the honeycomb material 104 at predetermined points. In a similar manner, the shield 109 may be disposed and connected at selected points along the honeycomb material.

The force and deceleration delimiting device 100 further includes an optional protection shield 111 about the spooled support surface 105 and/or shield 109. The protection shield 111 is comprised of any of a variety of suitable flexible materials known to those skilled in the art.

Figure 8:
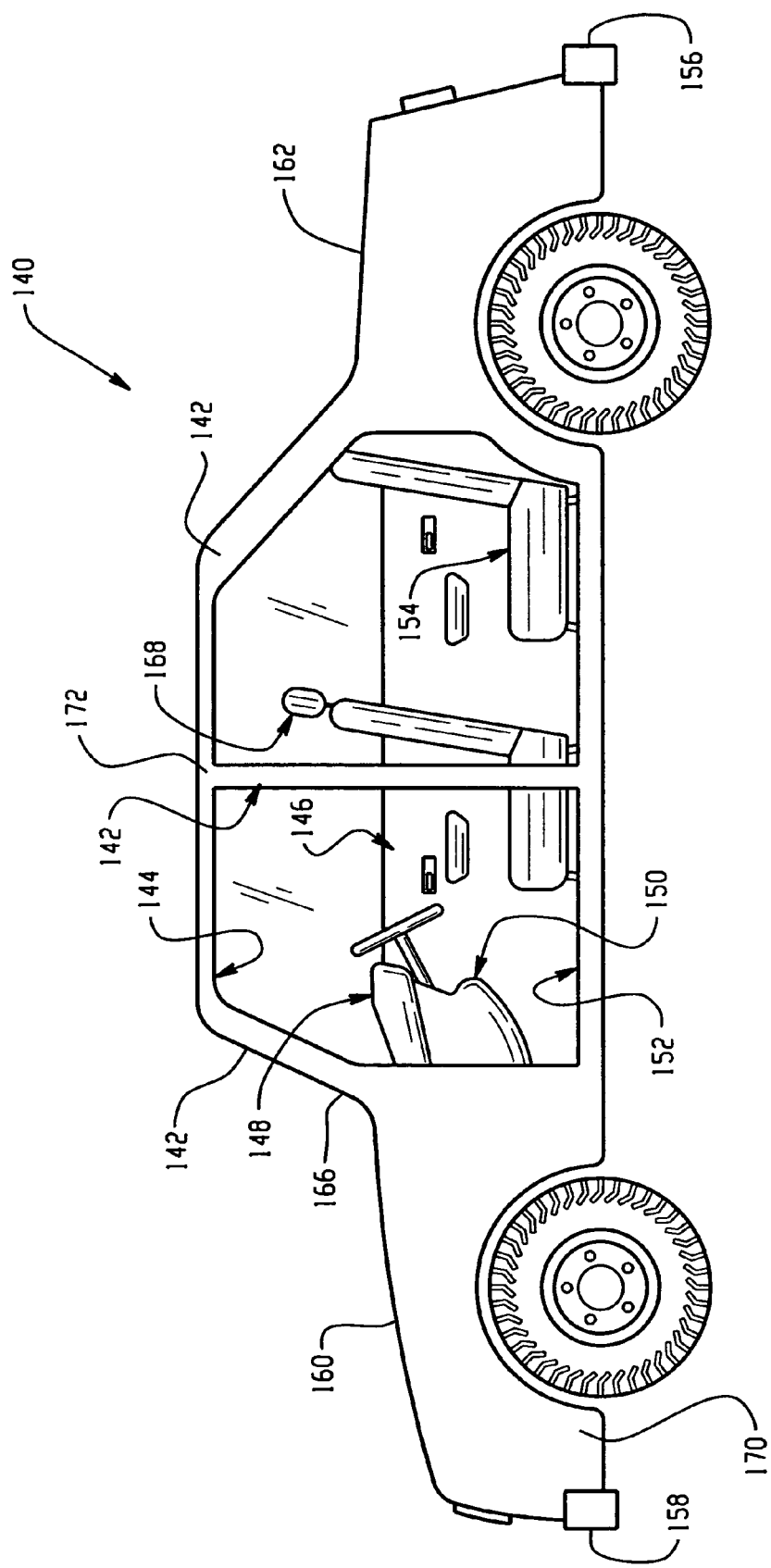
FIG. 8 is a perspective view of a vehicle illustrating various support structures for employing the force and deceleration delimiting device.

FIG. 8 is a perspective view of a vehicle 140 illustrating various support structures and stationary surfaces for employing the energy-absorbing device 100. For example, the force and deceleration delimiting device 100 can be used in conjunction with conventional padded interior surfaces in the vehicle 140. Specifically, the device 100 can be used for the door pillars 142, the header 144, the door interiors 146, dashboard 148, the knee bolsters 150, head rest 168, and other areas such as under the carpet on the vehicle floor 152, the seat 154 itself, or like surfaces where absorption of kinetic energy/limiting of forces/decelerations caused by impact of an object with the surface is desired and/or proper positioning of an occupant is desired during a triggering event such as an impact. For example, locating the energy-absorbing assembly under the carpet can be used to assist the positioning of an occupant's knees with respect to the knee bolster. In the seat area, the device can be strategically positioned to provide stiffening at an edge of the seat 154. Forces/decelerations due to impact with other areas of the vehicle, such as the door pillars 142, can be reduced with device 100.

As further shown in FIG. 8, the device 100 may be placed outside the vehicle 120. As shown, the device 100 may be positioned at an exterior/interior surface of a bumper 156, 158, hood 160, trunk 162, roof 172, wheel well 170, cowl 166, and like areas.

The force and deceleration delimiting device 100 can be tailored to the site of application. For example, for exterior sites such as the vehicle bumper and fender, triggering can occur prior to a triggering event, or at the time of the triggering event. The triggering event is not intended to be limited to a single event. For example, the triggering event may occur if a variety of conditions are detected or sensed, e.g., an impact event at a vehicle speed greater than 15 kilometers per hour. As such, a pre-crash sensor and/or an impact severity prediction algorithm can be employed to program the electronic control module 128. The expansion of the honeycomb-celled structure would be rapid or slow, greater or lesser depending on how the system is programmed. Devices used in this location could be designed to be reversible in the event of false crash detection, as their deployment has no effect on the operation of the vehicle. For example, devices 100 within the vehicle 120 may be deployed either before or during an impact event. If deployed before the impact event, the expansion of the honeycomb-celled material could be fast or slow, and would require a pre-impact sensor (and, optimally, with a impact severity algorithm) for selective triggering. If deployed during an impact event, the expansion of the honeycomb-cellular structure must be rapid, and should occur only at speeds where significant crush will occur. Accordingly, triggering may be effected by crash caused displacements. Devices used in this location would not be reversible and would require a very accurate detection system, as their deployment could interfere with operation of the vehicle.

While the disclosure has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A force and deceleration delimiting device for a vehicle, the device comprising:
   an open celled material expandable from a non-expanded state to an expanded state, wherein the open celled material is sandwiched between a first end cap member and a second end cap member;
   a support surface cooperatively positioned with the open celled material to cover a surface of the open celled material in the expanded and the non-expanded states;
   an activation mechanism adapted to regulate selective expansion of the open celled material from the non-expanded state to the expanded state in response to a triggering event;
   a protection shield cooperatively positioned with the open celled material to cover a surface of the open celled material in the expanded and non-expanded states;
   said protection shield being characterized by a compact shape when the open celled material is in the non-expanded state; said protection shield being characterized by a coiled or folded configuration in said compact shape;
   wherein the activation mechanism comprises:
      a compression spring in biased communication with the first end cap member and the second end cap member when the open celled material is in the non-expanded state;
      an opening in the first end cap member corresponding to a first shape;
      a disk rotatably engaged with the opening of the first end cap member, wherein the disk is lockingly engaged with the first end cap member in the non-expanded state and is coaxially aligned with the opening in the expanded state; and
      a trigger in operative communication with the disk adapted to effect rotation of the disk in response to the triggering event.

2. The force and deceleration delimiting device of claim 1, wherein the open celled material comprises a honeycomb cellular structure.

3. The force and deceleration delimiting device of claim 1, wherein the support surface has a compact shape when the open celled material is in the non-expanded state and an expanded state when the open celled material is in the expanded state.

4. The force and deceleration delimiting device of claim 3, wherein the compact shape of the support surface is characterized by a coiled or folded configuration.

5. The force and deceleration delimiting device of claim 1, wherein the support surface comprises a vehicle surface.

6. The force and deceleration delimiting device of claim 1, wherein the open celled material is aluminum.

7. The force and deceleration delimiting device of claim 1, wherein the first end cap member is fixedly attached to a stationary surface within the vehicle.

8. The force and deceleration delimiting device of claim 1, wherein said activation mechanism comprises:
an expansion agent in operative communication with the first end cap member and the second end cap member, wherein the expansion agent is adapted to effect expansion of the open celled material; and
a controller in operative communication with the expansion agent.

9. The force and deceleration delimiting device of claim 8, wherein the expansion agent comprises a pyrotechnic device or a fluid pressurized cylinder.

10. The force and deceleration delimiting device of claim 8, further comprising a sensor in electrical communication with the controller.

11. The force and deceleration delimiting device of claim 1, wherein the expanded state of the open celled material comprises a transverse plane substantially perpendicular to an anticipated crash axis, wherein the anticipated crash axis is substantially parallel to a cellular axis of cells of the open celled material.

12. The force and deceleration delimiting device of claim 1, wherein the force and deceleration delimiting device has a non-expanded volume of $\frac{1}{10}$th to $\frac{1}{60}$th relative to an expanded volume.

13. The force and deceleration delimiting device of claim 1, wherein the first end cap member has a different shape from the second end cap member.

14. A force and deceleration delimiting device for a vehicle, the device comprising:
an open celled material expandable from a non-expanded state to an expanded state, wherein the open celled material is sandwiched between a first end cap member and a second end cap member;
a support surface cooperatively positioned with the open celled material to cover a surface of the open celled material in the expanded and the non-expanded states;
an activation mechanism adapted to regulate selective expansion of the open celled material from the non-expanded state to the expanded state in response to a triggering event;
a protection shield cooperatively positioned with the open celled material to cover a surface of the open celled material in the expanded and non-expanded states;
said protection shield being characterized by a compact shape when the open celled material is in the non-expanded state; said protection shield being characterized by a coiled or folded configuration in said compact shape;
wherein the support surface has a compact shape when the open celled material is in the non-expanded state and an expanded state when the open celled material is in the expanded state; and
wherein the support surface is spooled and has one end fixedly attached to the first end cap member and an other end fixedly attached to the second end cap member.

15. The force and deceleration delimiting device of claim 14, further comprising a protective shield about the spooled support surface.

* * * * *